United States Patent
Held et al.

(10) Patent No.: US 9,321,054 B2
(45) Date of Patent: Apr. 26, 2016

(54) ASSEMBLY, OPERATING METHOD AND CIRCUIT FOR A MILL DRIVEN BY A RING MOTOR

(75) Inventors: Harald Held, Haar (DE); Michael Metzger, Markt Schwaben (DE); Florian Steinke, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 637 days.

(21) Appl. No.: 13/811,881

(22) PCT Filed: Jun. 30, 2011

(86) PCT No.: PCT/EP2011/061068
§ 371 (c)(1),
(2), (4) Date: Apr. 26, 2013

(87) PCT Pub. No.: WO2012/013443
PCT Pub. Date: Feb. 2, 2012

(65) Prior Publication Data
US 2013/0214069 A1  Aug. 22, 2013

(30) Foreign Application Priority Data

Jul. 29, 2010 (EP) .................................... 10007918
Dec. 28, 2010 (DE) .......................... 10 2010 064 263

(51) Int. Cl.
*B02C 25/00* (2006.01)
*B02C 11/00* (2006.01)
(Continued)

(52) U.S. Cl.
CPC ................. *B02C 11/00* (2013.01); *B02C 17/18* (2013.01); *B02C 17/1805* (2013.01); *B02C 25/00* (2013.01); *G05B 11/01* (2013.01)

(58) Field of Classification Search
CPC .... B02C 11/00; B02C 17/18; B02C 17/1805; B02C 25/00; G05B 11/01

USPC .................................... 241/25, 5, 33; 318/460
See application file for complete search history.

(56) References Cited

U.S. PATENT DOCUMENTS 2,235,928 A    3/1941  Harlowc .......................... 241/34
4,404,640 A    9/1983  Dumbeck et al. ............. 702/182
(Continued)

FOREIGN PATENT DOCUMENTS

| DE | 1131073 B | 6/1962 | ............. B02C 17/08 |
| DE | 102006038014 B3 | 4/2008 | ............. B02C 17/18 |
| WO | 2012/013443 A2 | 2/2012 | ............. B02C 17/18 |

OTHER PUBLICATIONS

Almond, D.G. et al., "Performance Enhancement Tools for Grinding Mills," First International Platinum Conference, South African Institute of Mining and Metallurgy, 8 pages, 2004.
(Continued)

*Primary Examiner* — Mark Rosenbaum
(74) *Attorney, Agent, or Firm* — Slayden Grubert Beard PLLC (57) ABSTRACT

An assembly is provided for receiving characteristic data of a mill including a rotating mill sleeve having rotor coils and a stator having stator coils, wherein oscillations of the mill sleeve are transmitted to stator coils and/or measurement coils on the stator. The assembly may include stator coil(s) configured to tap power supply induction voltages to detect oscillations of the mill sleeve, wherein the stator coil(s) and/or measurement coil(s) designed to tap induction voltages are positioned in a sector of the mill sleeve in which large oscillations are expected based on the scale of the mill sleeve. Further, a method includes determining the induction voltage induced on stator coil(s) and/or measurement coil(s) by tapping at least one stator coil power supply and/or by tapping at least one measurement coil, and deriving status variable(s) of a milling method that reflect the fill level status in the sector of the respective coil.

12 Claims, 7 Drawing Sheets

(51) Int. Cl.
*B02C 17/18* (2006.01)
*G05B 11/01* (2006.01)

(56) References Cited

U.S. PATENT DOCUMENTS

| | | |
|---|---|---|
| 5,698,797 A | 12/1997 | Fontanille et al. ........... 73/865.9 |
| 5,994,787 A * | 11/1999 | Hibino ................. H02J 7/1438 219/205 |
| 6,874,366 B2 | 4/2005 | Ortega et al. ................... 73/649 |
| 8,366,029 B2 | 2/2013 | Becker et al. ................. 241/30 |
| 2004/0255680 A1 | 12/2004 | Ortega et al. ................... 73/649 |
| 2005/0279870 A1 | 12/2005 | Scuccato .................... 241/101.2 |
| 2008/0097723 A1 | 4/2008 | Pontt Olivares et al. ...... 702/182 |
| 2010/0230519 A1 | 9/2010 | Torres et al. .................... 241/25 |
| 2010/0326337 A1 | 12/2010 | Tsutsumi et al. ............. 110/186 |

OTHER PUBLICATIONS

Pontt, Jorge, "MONSAG: A New Monitoring System for Measuring the Load Filling of a SAG Mill," Minerals Engineering, vol. 17, Elsevier, 6 pages, Jun. 23, 2004.

International Search Report and Written Opinion, Application No. PCT/EP2011/061068, 8 pages, Jun. 22, 2012.

* cited by examiner

Equations

$$F_{DrehMo} = B I_{DrehMo} L_{eff} \qquad (1)$$

$$U_{ind} = W/q = (F_{ind,1} - F_{ind,2}) L_{eff}/q \qquad (2)$$
$$= \Delta B\, q\, v\, L_{eff}/q = f\, B\, v\, L_{eff}$$

$$U_{ind} = f\, F_{DrehMo}\, v / I_{DrehMo} = f\, P / I_{DrehMo} \qquad (3)$$
$$(I_{DrehMo} = 3kA,\ P = 20MW):$$
$$U_{ind} = f * 6.6kV$$

| | |
|---|---|
| $F_{DrehMo}$ | Force of coil wire |
| $I_{DrehMo}$ | Current through coil wire |
| $B$ | Magnetic field in motor |
| $L_{eff}$ | Possible length of coil wire (perpendicular to B) |
| $F_{ind}$ | Force on charge within wire due to induction effect |
| $U_{ind}$ | Induction voltage |
| $\Delta B = f\, B$ | Field changes due to oscillation |
| $v$ | Speed of coil wire |
| $P$ | Power input of mill |

FIG 6

Kirchhoff:

$$R_C I_1 + L I'_1 = R_C I_2 + L I'_2 + U_{ind}$$

$$U_{ind} = L \Delta I' + R_C \Delta I \qquad (4)$$

FIG 7

Kirchhoff:

$$U_{BC} = -R_M I_1 + R_M I_2 = -R_M \Delta I$$

$$\Delta I' = -U'_{BC} / R_M$$

$$U_{ind} = R_C / R_M U_{BC} - L / R_M U'_{BC} \qquad (5)$$

FIG 8

Kirchhoff:

$$U_{AB} = L_M I'_1 - L_M I'_2 = L_M \Delta I'$$

$$\Delta I' = U_{AB} / L_M - \lambda \Delta I \quad (6)$$

$$U_{ind} = U_{AB} L / L_M + R_C \Delta I \quad (7)$$

FIG 9

ASSEMBLY, OPERATING METHOD AND CIRCUIT FOR A MILL DRIVEN BY A RING MOTOR

CROSS-REFERENCE TO RELATED APPLICATIONS

This application is a U.S. National Stage Application of International Application No. PCT/EP2011/061068 filed Jun. 30, 2011, which designates the United States of America, and claims priority to EP Patent Application No. 10007918.5 filed Jul. 29, 2010 and DE Patent Application No. 10 2010 064 263.0 filed Dec. 28, 2010. The contents of which are hereby incorporated by reference in their entirety.

TECHNICAL FIELD

The disclosure relates to an assembly, an operating method and a circuit for a mill driven by a ring motor, which can be used especially for ores, for example in the mining or processing industry.

BACKGROUND

Usually semi-autogenous mills (SAG) and bowl mills which are designed for appropriate application are used. These mills include a rotating cylinder which is filled with ore which is to be milled or pulverized. Since the cylinder rotates around an axis which essentially lies horizontally, the material (charge) will be lifted in the mill and subsequently falls back onto the material left below on the floor of the mill. In this connection gravitational forces in particular are exploited. The impact of the lumps of ore and also the friction within the circulating charge causes the ore to be broken up.

In order to increase the milling performance, in a few mill variants steel balls are additionally added to the charge. The agitation or raising of the charge material is supported during rotation by what are known as liners, which are embodied in the shape of paddle-like structures on the inner mill wall.

For optimum control purposes it is useful to be able to measure characteristic variables of the milling methods used. The following are examples of such variables:

The volumetric charge level of the mill,
The geometrical position of the charge,
The weight of the charge,
The amount of steel balls in the mill,
The amount of water in the mill,
The number of impacts on the liners per unit of time and
The size distribution of the lumps of ore in the mill.

In order to minimize the enormous energy consumption of the mill or to maintain a constantly high throughput or in order to reduce the number of particles striking the inner mill wall (liner impact), the knowledge of the above data of the milling plants is useful. Because of the milling geometry and the harsh environmental conditions it is not readily possible, in certain conventional milling plants, to measure the above-mentioned method variables during operation for example.

Different methods are known in the art to determine the overall weight of the material in the mill for example. A simple form includes evaluating the oil pressure in the mill bearings. A further way is by measuring the power consumption [1].

In the art in accordance with [2] the overall weight of the mill charge is determined by its influence on the initial mass inertia moment of the mill. The moment can be derived from the reaction of the mill speed to a small change in the torque.

In publication [3] an electromagnetic source within the mill and a receiver on the outside of the mill are used to measure the amount of ore and of steel balls in the mill and also for measuring the liner wear.

A classical and currently generally used way of determining the charge of a mill with a quantitative measure is what is known as the "Hardinger Electric Ear Method" [4]. If the loading of the mill is too small, numerous impacts on the liners will be recorded and generate loud noise. The "Hardinger Electric Ear" uses a microphone on the outside of the mill to measure the amplitude of the sound being produced.

The acoustic amplitude recording can be searched for amplitude peaks, from which the precise number of impacts on the liners can be deduced. This system is known as an "Impact Meter" [5] (crushing or impact measuring device).

Acoustic detection has been further developed by [5, 6]. In these methods a wireless microphone is attached to the mill sleeve or mill outer wall, in order to measure the breakage/impact noise inside the mill which is generated in the vicinity of the position of the microphone. Since the microphone rotates together with the mill, this "sees" all the positions in a mill cross-section. The geometrical position of the charge can be derived from the difference between the sound amplitudes.

In accordance with publications [7, 8] the use of electrical control variables of a load commutated inverter (LCI) drive is proposed in order to estimate the current load of the mill in relation to the current and in order to detect particular error states of the LCI drive. The method appears to be particularly designed for LCI drives.

The said methods include a little information about the milling status. However no measurement is possible for example for the lump size distribution and also for reliable measurement of the proportions of steel balls, ore and water during operation.

SUMMARY

One embodiment provides an assembly for determining characteristic data of a mill driven by a ring motor, having a rotating mill sleeve with rotor coils and a stator with stator coils, wherein oscillations of the mill sleeve are transmitted to stator coils and/or to measurement coils positioned on the stator and the assembly for measurement of induction voltages or currents has the following features: at least one stator coil, which is designed for tapping induction voltages or currents at its power supply, for detection of electrical signals as a result of oscillations of the mill sleeve at the position of the at least one stator coil, and/or at least one measurement coil which is designed to receive induction voltages or currents which is attached to the stator and is able to be read at separately, for detection of oscillations of the mill sleeve at the position of the at least one measurement coil on the stator, wherein the at least one stator coil and/or the at least one measurement coil are positioned in each case in a sector, in which in relation to the circumference of the mill sleeve significant oscillations of the mill sleeve are to be expected.

A further embodiment is characterized by the at least one stator coil and/or the at least one measurement coil, for receiving induction voltages or currents, which is positioned in a sector of the mill sleeve with the greatest possible oscillations, and at least one further stator coil and/or at least one further measurement coil, which is positioned in a sector of the mill sleeve with the smallest possible oscillations.

A further embodiment is characterized by the design of a plurality of differently positioned stator coils and/or measurement coils for tapping off induction voltages or currents.

Another embodiment provides a method for operating a mill driven by a ring motor, which comprises a rotating mill sleeve with rotor coils and a stator with stator coils, wherein oscillations of the mill sleeve are transmitted to stator coils and/or to measurement coils positioned on the stator, the method comprising the following steps: the induction voltage induced on at least one stator coil and/or on at least one measurement coil is determined by tapping off at the power supply of the at least one stator coil and/or by tapping on at least one measurement coil, and at least one state variable of a milling method is derived which reflects the state of the filling of the mill in the sector of the associated stator coil.

A further embodiment is characterized by an evaluation via model computations in order to obtain additional method variables, additional yields, as well as the portions of ore, of steel balls and of water in the mill.

A further embodiment is characterized by an evaluation of the spectrum of the oscillations, to obtain additional method variables, additional yields, as well as the portions of ore, of steel balls and of water in the mill.

A further embodiment is characterized by the determination of induction voltages or currents on at least one stator coil and/or at least one measurement coil in a sector of the mill sleeve with the greatest possible oscillations, as well as by the determination of induction voltages at least one stator coil in a sector with the smallest possible oscillations, as well as a differentiation between the induction voltages detected in different sectors.

A further embodiment is characterized by the determination of the difference between induction voltages which are detected at a plurality of stator coils and/or a plurality of measurement coils, wherein the stator coils are positioned once in a sector with small oscillations of the mill sleeve and another time in a sector with strong oscillations of the mill sleeve.

A further embodiment is characterized by the additional measurement of differences between currents induced in stator coils in different sectors, with which information can be determined about the timing curve of the movements in the mill sleeve.

Another embodiment provides a circuit for operating a mill driven by a ring motor for receiving characteristic data, which comprises a rotating mill sleeve with rotor coils and a stator with stator coils, wherein oscillations of the mill sleeve are transmitted to stator coils and/or measurements coils positioned on the stator, and the circuit for reading out an induction voltage from a stator coil comprises at least one readout coil for inductive readout at a connecting line of the stator coil.

A further embodiment is characterized by the reading out of at least one induction voltage, on at least two stator coils by means of at least two readout coils by inductive coupling at a terminal line of the at least two stator coils in each case, wherein the at least two stator coils are connected in parallel and the at least two readout coils are connected antiparallel in a separate measurement circuit, wherein the difference between the induction voltages is measured in the separate measurement circuit.

Another embodiment provides the circuit for operating a mill driven by a ring motor for receiving characteristic data, having a rotating mill sleeve with rotor coils and a stator with stator coils, wherein oscillations of the mill sleeve are transmitted to at least one stator coil and/or to at least one measurement coil positioned on the stator, and the circuit for calculation of characteristic data of a mill driven by a ring motor has at least one current measurement unit for the resistance measurement in the connecting lines at least one stator coil.

BRIEF DESCRIPTION OF THE DRAWINGS

Exemplary embodiments will be explained in more detail below on the basis of the schematic drawings, wherein.

DETAILED DESCRIPTION

Embodiments of the present disclosure are designed for measuring the course of the timing of the oscillations caused by the movements of the charge on the mill sleeve, so that at least one of the above-mentioned method variables of the system can be determined.

Other embodiments provide a suitable electric circuit for detecting the oscillations on the mill sleeve with high precision for selected positions on the mill sleeve.

Some embodiments are directed to the use of an electrical assembly which can be built into the mill in its drive and which serves for location-independent measurement of oscillations of the mill sleeve. This allows information about the state of the mill, such as the position or the volume of the mill charge, or other parameters to be determined.

A measurement of induction voltages or currents in at least one stator coil of the ring drive of the mill is carried out by means of an electrical circuit. With this circuit the induction effects as a result of location-dependent oscillations of the mill sleeve are detected by corresponding selection of the position of a stator coil to be read out and/or one or more measurement coils. In this case the mechanical rotor oscillations, which also propagate via the rotor coils and rotor magnets, create vibrations in the stator or in the stator coils and/or the measurement coils, which lead to induction effects.

A parallel circuit of coils is for example the basis for an assembly in accordance with the present disclosure. One embodiment lies in measuring the current difference between different stator coils or coil pairs and/or measurement coils.

If a coil is located in the vicinity of the upper area or the head part of the mill and few oscillations are produced around this position or in this sector, the current $I_1$ of this coil can be viewed as the undisturbed reference signal. Any differences of the currents $I_2$ or $I_3$ of further coils relative to $I_1$ are produced by the corresponding source such as stator coil or measurement coil. These are induction reactions as a result of the mechanical oscillations of the mill sleeve, which lead to induction effects in the stator coils and/or the measurement coils, which are likewise disposed on the stator.

The basic structure of the mill driven by a ring motor includes a rotatable hollow cylinder lying horizontally, which is referred to as a rotor and in which the milling process takes place. As a rule a ring with rotor magnets, which are equipped with rotor coils, is located at one end of the hollow cylinder. As well as the mechanical support of the hollow cylinder, a stator is present which represents a construction surrounding the ring with rotor magnets with a ring of stator magnets which are equipped with stator coils. The rotor magnets and the stator magnets overall form a ring motor through and intermeshing arrangement of the two rings, wherein the ring magnets and the stator magnets fit into each other in the radial direction with a small gap.

To measure the overall circumference of the mill sleeve the detection of a plurality, in the extreme case of all, stator coils is necessary. Alternatively a part or complete coverage with separate measurement coils 6 positioned on the stator can be used. These measurement coils, like the stator coils, lie in the effective area of the rotor magnets/rotor coils.

The detection of induction effects in sectors in which the plant is filled and large oscillations are to be expected is important. In addition a reference can be created in a sector with very small oscillations.

The measurement of current differences is advantageous by comparison with direct measurement of currents $I_1, I_2, I_3$, since a highly-sensitive measurement of the induction effects is made possible unhindered by the high-voltage/current background.

SAG mills and a few bowl mills are driven by large electrical, gearless ring drives which enclose the entire milling cylinder. The present disclosure describes an electrical assembly which is used in such a gearless drive to determine method variables mentioned above. In an underlying structure the position of the charge and also shoulder and foot position and the main impact zone can be measured and/or derived as disclosed herein.

Measuring induction voltages or currents in at least one stator coil is initially extremely different, which is attributable to many reasons. One contribution made by embodiments of the present disclosure is to provide a suitable electrical switch to measure the induction effects with high precision at each individual coil.

Measuring induction voltages or currents on at least one stator coil was previously problematic for the following reasons:

The primary reason to be mentioned is high background voltages and currents from normal mill operation, which lie in the kA, kV range for example. Measurements of small induction effects, in the mV range for example relative to the aforesaid background would require extremely high precision measurements.

Furthermore many external effects occur, because of which the drive current deviates from its desired sinusoidal shape, in cycloconverters for example or with other performance variants.

Effort is involved in distinguishing between the external effects of desired mill-internal signals, such as the oscillations of the mill sleeve 13 for example, from drive noises for example.

Certain advantages may be provided by the evaluation using model computations in relation to known method variables. Advantages are additional yields as well as the further determination of variables such as proportions or ore, of steel balls and of water in the mill.

Figure 1:
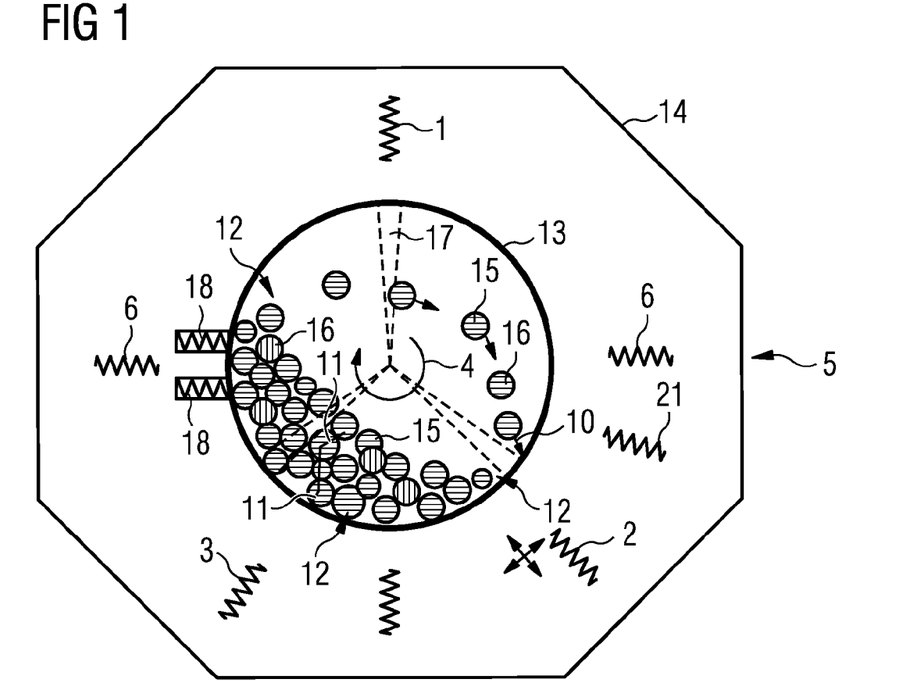
FIG. 1 shows a schematic cross sectional view of a known circulating crusher plant.

FIG. 1 shows a schematic front view of a circulating mill plant. The largest portion within the mill is covered by fill materials which occupy a significant sector of the cylinder. Balls with horizontal stripes signify ore 15; balls with vertical stripes signify steel balls 16. The filling is restricted by the shoulder and foot position as well as the mill sleeve 13, here a hollow cylinder. A few materials leave this sector of the mill during rotation in the vicinity of the position of a liner (not shown) and act on the floor of the mill in the vicinity of the foot position. Impact forces 10 and force chains 11 within the materials/filling impart oscillations to the sleeve. Many chaotic oscillations can be expected and the amplitude of the oscillations will depend on their location. A large amplitude will be produced accordingly at the position of the stator coil 2, a medium amplitude corresponding to the position of stator coil 3, and an almost zero amplitude position corresponding to stator coil 1.

Rotor coils 18 are indicated in FIG. 1. These are attached multiply in a ring shape around the rotating mill sleeve 13. The stator coils 1, 2, 3 located on the stator 5, are at fixed locations and pick up oscillations of the passing rotor magnets or rotor coils 18. Viewed thus, the selection of the position of a stator coil 1, 2, 3 or the positioning of a measurement coil 6 for a measurement on the stator 5 is governed by the location of a selected sector 17, which also has a fixed location relative to the stator. The term "location-dependent" means here that different positions on the mill sleeve are connected with different events along the circumference of the cylinder. The stator 5, the stator coils 1, 2, 3, an optional measurement coil 6, and the respective sector 17 are static. The mill sleeve rotates, wherein the location of events with the filling remains constant relative to the stator. A mechanical/electrical conversion takes place at the stator, by transmitted mechanical oscillations being able to be tapped as an electrical signal as a result of the induction effects at the stator coils 1, 2, 3 or at the measurement coil 6.

Mechanical oscillations of the mill sleeve 13 are to be measured in a location-dependent manner, wherein the underlying contribution of the present disclosure involves pulling the motor, including stator coils and rotor coils, towards the mill sleeve for measuring the oscillation at the mill sleeve and not of an external acoustic sensor.

This functions as follows:
  The rotor magnets of the gearlessly (without gears) driven mill are mounted in the shape of a ring on the outer side of the mill sleeve 13,
  the surrounding drive body 14 represents the stator of the drive,
  through movements/oscillations of the mill sleeve and thus also of the rotor magnets, induction voltages are created in the stator coils which are proportional to the amount of the movement of the rotor.

Since there are numerous separate stator coils, around 50-100 poles in a typical SAG drive, the induction effect is able to be measured separately in each coil, so that a local dependency of the oscillations of the mill sleeve is able to be detected, from which important state variables of the crushing process can be derived.

Current fluctuations of $I_1$ or $I_2$ induce voltages in readout coils $L_M$. If the coils are connected antiparallel, only the induction voltage difference between points A and B will be measured. The voltage difference is proportional to the difference between $I_1$ and $I_2$ for current fluctuations.

Figure 2:
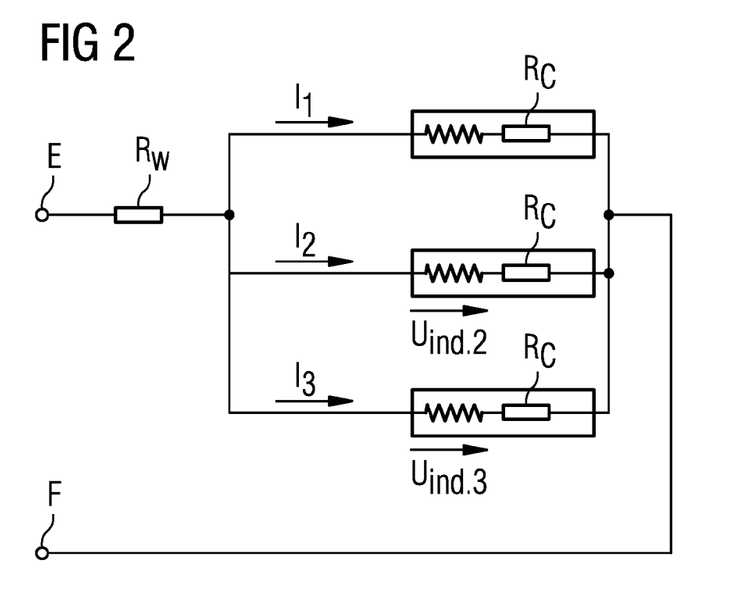
FIG. 2 shows a known schematic electrical circuit of the coils.

In accordance with FIG. 2 the coils of an individual phase are connected in parallel and induction voltages in a coil generally cause currents to flow in the parallel circuit. This leads to current differences between the currents $I_1, I_2, I_3$. Previously induction effects could only be measured inadequately at the common power terminals or the power supply E, F.

The parallel circuit corresponds to the basis for an assembly according to the present disclosure. One embodiment includes measuring the current difference/voltage difference between measurement signals from stator coils or measurement coils positioned on the stator circumference. Since stator coil 1 is located in the vicinity of the upper area or the head part of the mill, as shown in FIG. 1, and there are few oscillations around this position, neither an impact 10, nor force chains 11, the current $I_1$ can be seen as the undisturbed reference signal. Any differences from $I_2$ or $I_3$ relative to $I_1$ must arise from the required signal source, stator coil 1, 2, 3 and/or a measurement coil 6. Current differences make possible access to the time sequence of the movements of the mill sleeve 13. The fact that the current differences can be recorded independently of each other for all coils makes a location-dependent of the movements of the mill sleeve possible.

The measurement of current differences is advantageous for a number of reasons compared to the measurement of $I_1$, $I_2$, $I_3$. This makes possible a sensitive measurement of the induction effects, unhindered by the high voltage/high current background. Furthermore external faults act on power supply such that all parallel currents are influenced equally and difference measurements of the current are often insensitive, so that no signal can be analyzed.

Since direct information about the movement of the mill sleeve 13 around a complete "cross section" (at least one revolution) of the mill has been obtained, signal processing tools together with the additional input of a charge weight and a power consumption as well as the position of foot and shoulder of the charge are set as a ratio to one another and the total volume of the charge as well as the proportion of steel balls/ore/water are determined.

This enables costs compared to certain conventional plants to be reduced significantly and a robust design is obtainable which withstands harsh environmental conditions. The structure does not need batteries or rechargeable cells which have to be replaced or charged at intervals, and thus give rise to additional costs. Batteries or rechargeable cells are needed for example for acoustic sensors on the outside of the mill sleeve, since these turn along with the sleeve and cannot be equipped with a mains-based power supply.

Further different process variables can be determined on the basis of the weight of the filling of the mill. In doing so, the present disclosure manages without additional sensors outside the mill drive.

Figure 3:
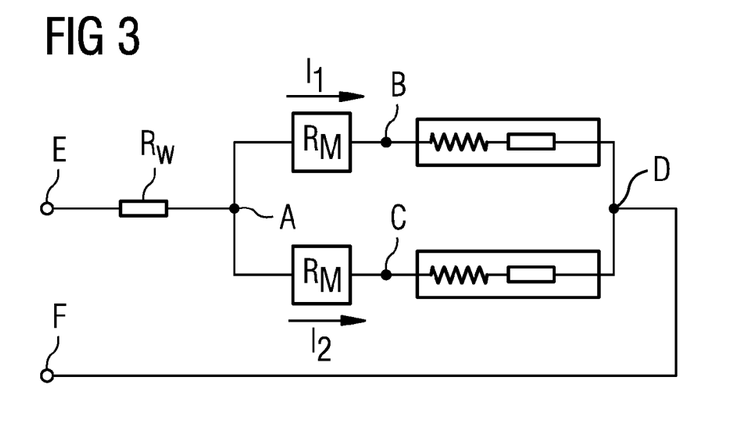
FIG. 3 shows an arrangement for resistance measurement or current difference measurement I.
Figure 4:
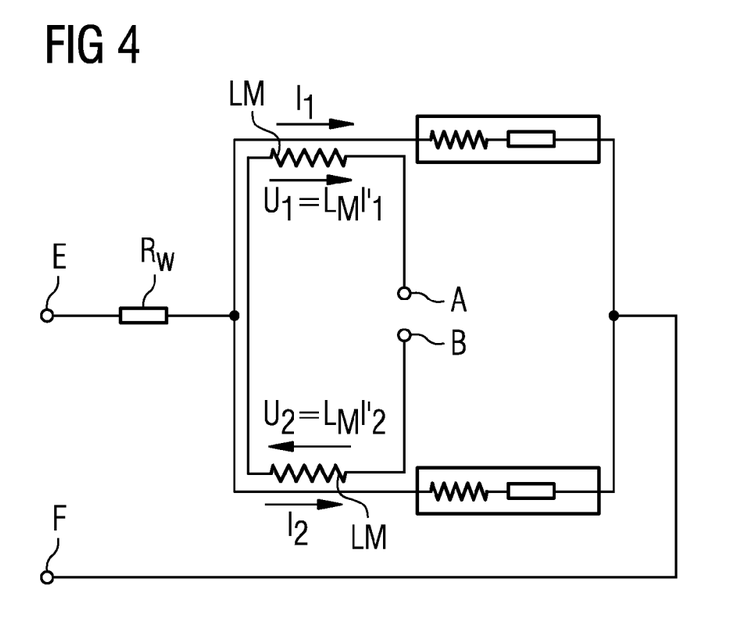
FIG. 4 shows an arrangement for inductive measured value tapping or for current difference measurement II.

Two realizations of the disclosure are shown in FIG. 3 and FIG. 4, which make it possible to measure current differences or voltage differences with high accuracy.

In accordance with FIG. 3 measurements of the resistance measurement $R_M$ are shown. Voltage differences between the points B and C, which can be measured with very great accuracy, are proportional to current differences.

FIG. 4 shows an inductive layout. Current fluctuations from $I_1$ or $I_2$ induce voltages in the described read-out coils $L_M$.

If the coils are connected antiparallel, only the induction voltage difference between points A and B are measured. The voltage difference is proportional to the difference with current fluctuations of $I_1$ and $I_2$.

Theoretical observations and estimates of the effects occurring including the significant mathematical formulae are shown in FIGS. 5-8.

Figure 5:
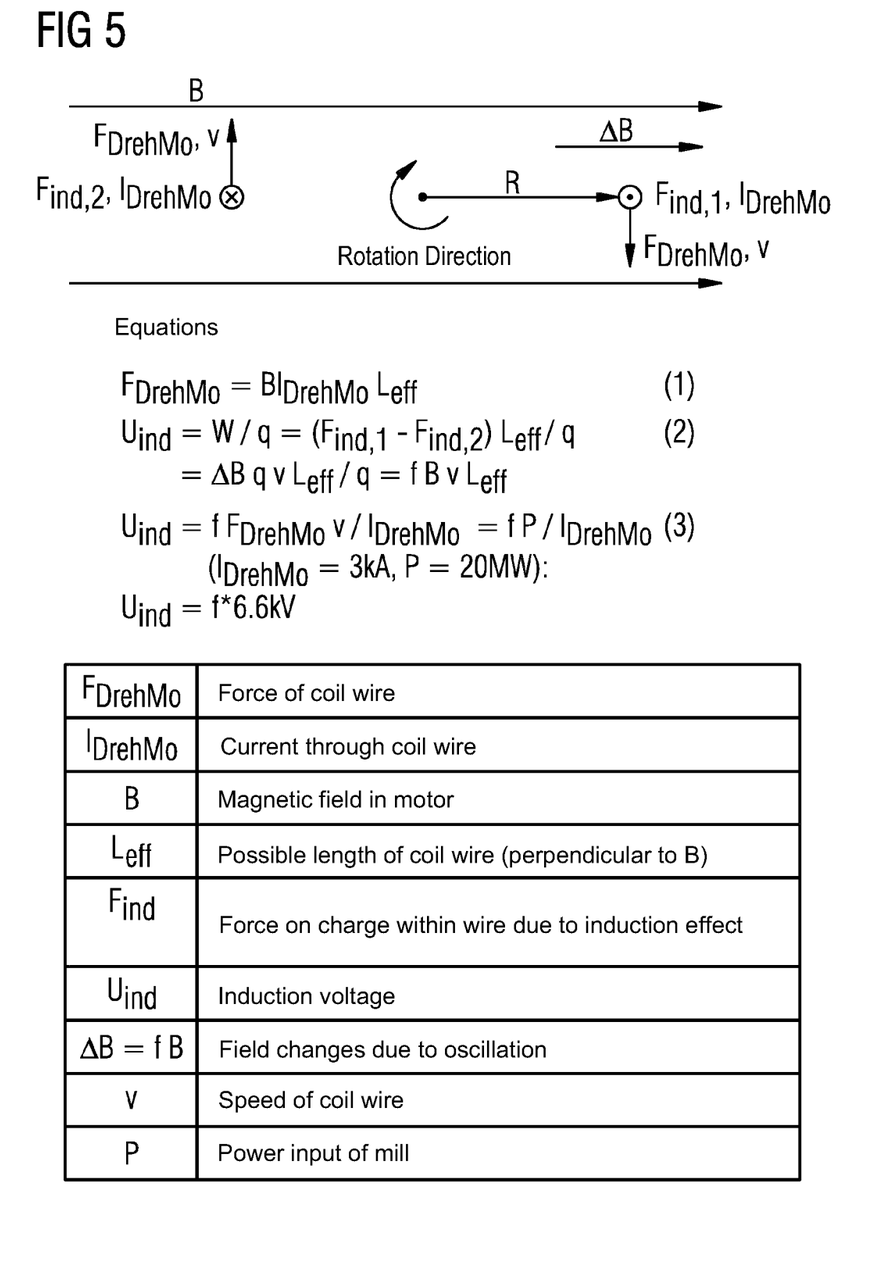
FIG. 5 shows a scheme for estimating the induction voltage, especially for a transvector closed-loop control drive.

FIG. 5 shows a schematic view of an electrical drive, represented by symbols. Despite the considerable simplification of a real representation, the significant elements are reproduced to a sufficient degree to enable the consequences in accordance with the size of the induction effects to be estimated.

FIG. 5 gives an overall view of how a single wire loop rotates in a magnetic field B. In the vicinity of one of the wires in the cross section the field is disturbed by a small inhomogeneity ΔB; a small portion f of B, is caused by the mechanical movements of the coils creating a field on the mill sleeve.

The resulting induction voltage can be estimated in the following way:

Equation (1) represents the Lorenz force law for the moment creation as a result of the current flow through the wire.

Equation (2) specifies the induction voltage, for example work per charge, which is produced via the effect of the Lorentz forces on the charge in the wire multiplied by the length of the wire.

The Lorentz forces for their part are proportional to the field. The equations (1) and (2) can be combined into moment creation force times the speed of rotation. After using realistic figures for the power and the currents for a 40-foot SAG mill, induction voltages in the order of magnitude of kV multiplied by the disturbance factor of the field are reached. If the induction voltages were able to be measured in the range of mV, the opportunity would be provided of being able to detect field changes of the order of magnitude of up to 0.0001%.

Figure 6:
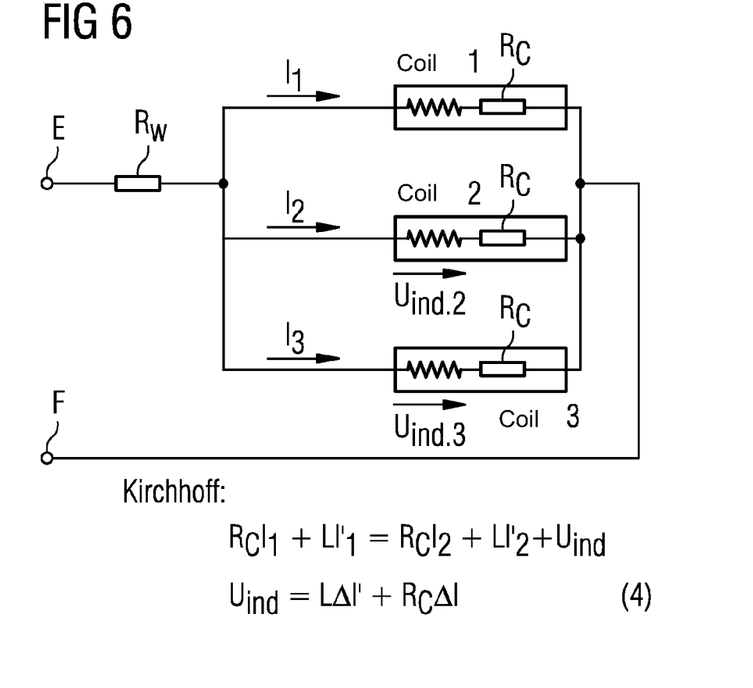
FIG. 6 shows the schematic diagram of an electrical circuit for coils with corresponding equations.

A stator coil circuit is shown in FIG. 6. An expression can be derived from the Kirchoff law which applies to the induction voltage current difference ΔI and represents a time derivative of ΔI', as is reproduced in equation (4).

Figure 7:
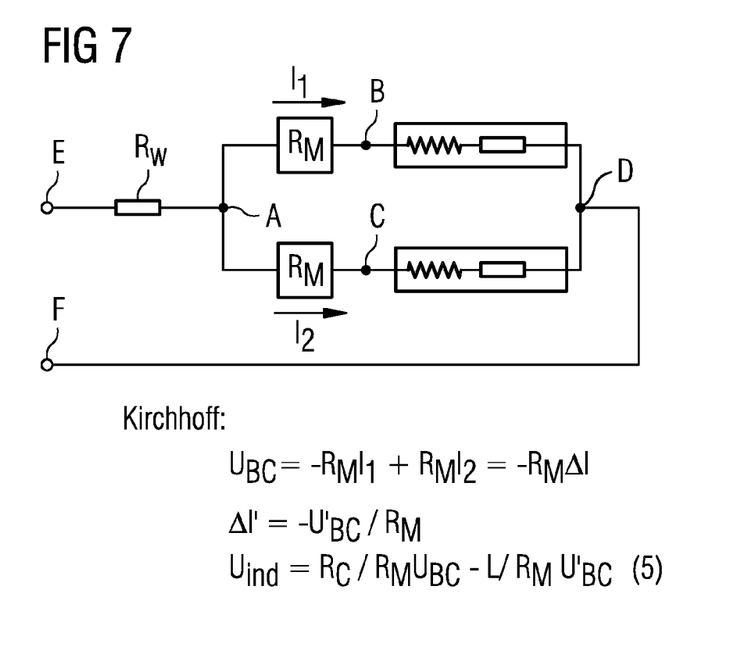
FIG. 7 shows a schematic diagram for current difference measurement I with equations.

FIG. 7 shows how the first of the two proposed current difference measurement circuits is realized. The final expression for the required signals, for example the induction voltage based on the measured power values, for example $U_{BC}$ in this case, is reproduced by the equation (5). The expression requires the derivation of the measured voltage $U_{AB}$, which is obtained by a (smoothing) derivative filter from $U_{AB}$.

Figure 8:
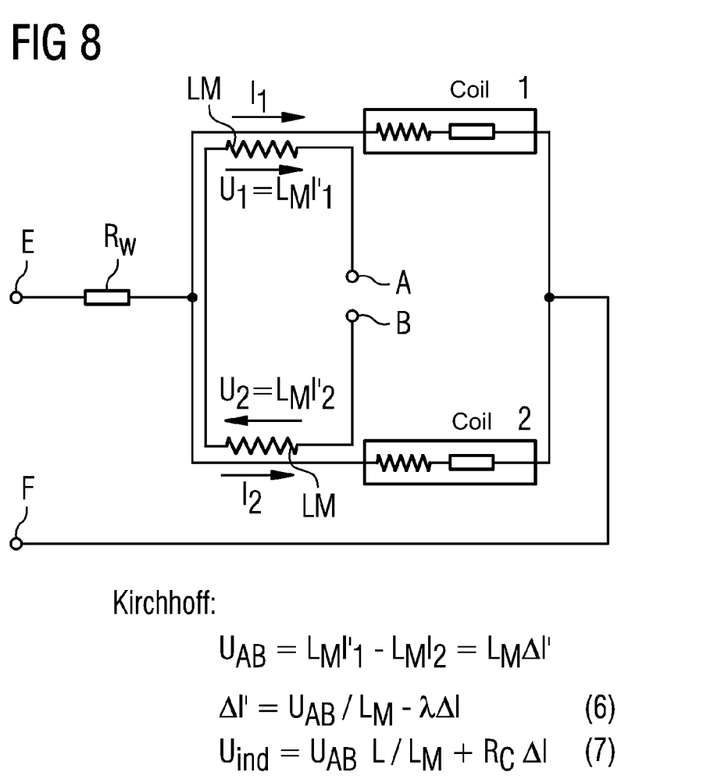
FIG. 8 shows a schematic diagram for current difference measurement II with corresponding equations.

FIG. 8 reproduces the second current difference measurement layout. In this case the measured $U_{AB}$ signal is proportional to the temporal derivation of the current difference. Thus an integration is necessary in this case for the final expression for the target induction voltage in equation (7). The integration can be stabilized by the addition of a small exponential attenuation element, as is reproduced in equation (6).

The possibility of determining the current induction voltage enables deductions to be made about the time-variable magnetic field inhomogeneities, of which the high-frequency components are generated by small mechanical vibrations on the mill sleeve, as is shown in accordance with equation 3 and in FIG. 5. Thus the complete time curve of these vibrations is reconstructed by the measurements described above.

Figure 9:
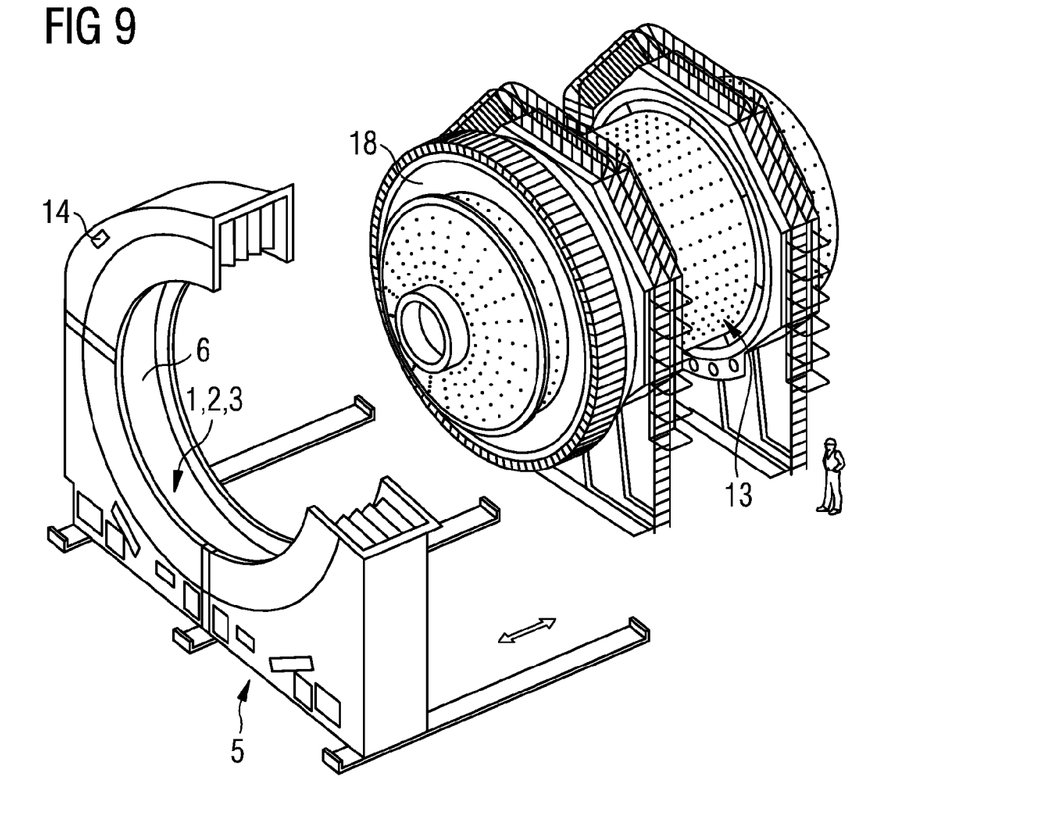
FIG. 9 shows a diagram of an opened and partly exploded mill with ring motor.

FIG. 9 shows a model of the mill with ring motor drive. The hollow cylinder labeled as mill sleeve 13 is driven. Inside it is the charge 12 which on rotation of the mill sleeve is constantly circulated. The stator 5 of the ring motor is pulled forwards and stator coils are indicated. Measurement coils 18 are disposed in the area of the stator coils 1, 2, 3.

LITERATURE REFERENCES

[1] U.S. Pat. No. 4,404,640
[2] DE 10 2006 038 014 B3
[3] U.S. Pat. No. 5,698,797
[4] U.S. Pat. No. 2,235,928

[5] D. G. ALMOND, W. VALDERRAMA, "Performance enhancement tools for grinding mills", First International Platinum Conference, 2004
[6] U.S. Pat. No. 6,874,366
[7] Jorge PONTT, "MONSAG: A new monitoring system for measuring the load filling of a SAG mill", Minerals Engineering 17, 2004, pages 1143-1148
[8] US 2008/0097723

What is claimed is:

1. An assembly for determining characteristic data of a mill driven by a ring motor, the mill having a rotating mill sleeve with rotor coils and a stator with stator coils, wherein oscillations of the mill sleeve are transmitted to stator coils and/or to measurement coils positioned on the stator, the assembly comprising:
at least one of:
at least one stator coil configured for tapping induction voltages or currents at its power supply to detect electrical signals caused by oscillations of the mill sleeve at a position of the at least one stator coil, and
at least one measurement coil configured to receive induction voltages or currents and attached to a stator, the at least one measurement coil capable to detect oscillations of the mill sleeve at a position or positions of the at least one measurement coil on the stator,
wherein each of the at least one stator coil or measurement coil is positioned in a sector in which, with respect to the circumference of the mill sleeve, significant oscillations of the mill sleeve are expected.

2. The assembly of claim 1, wherein:
each stator coil or measurement coil configured for tapping or receiving induction voltages or currents is positioned in a sector of the mill sleeve experiencing maximum oscillations, and
at least one other stator coil or measurement coil is positioned in a sector of the mill sleeve experiencing minimum oscillations.

3. The assembly of claim 1, comprising a plurality of differently positioned stator coils and/or measurement coils for tapping off induction voltages or currents.

4. A method for operating a mill driven by a ring motor, the mill comprises a rotating mill sleeve with rotor coils and a stator with stator coils, wherein oscillations of the mill sleeve are transmitted to stator coils and/or to measurement coils positioned on the stator, the method comprising:
determining an induction voltage induced on at least one stator coil and/or at least one measurement coil by tapping off at the power supply of the at least one stator coil and/or by tapping on at least one measurement coil,
deriving at least one state variable of a milling method that reflects a filling state of the mill in a sector of an associated stator coil.

5. The method of claim 4, comprising performing an evaluation using model computations to obtain additional method variables, additional yields, and to determine portions of ore, steel balls, and water in the mill.

6. The method of claim 4, comprising evaluating the spectrum of the oscillations to obtain additional method variables, additional yields, and to determine portions of ore, steel balls, and water in the mill.

7. The method of claim 4, comprising:
determining induction voltages or currents on at least one stator coil and/or at least one measurement coil in a sector of the mill sleeve with the greatest possible oscillations,
determining induction voltages at least one stator coil in a sector with the smallest possible oscillations, and
detecting a differentiation between the induction voltages in different sectors.

8. The method of claim 4, comprising:
determining a difference between induction voltages detected at a plurality of stator coils and/or a plurality of measurement coils,
wherein the stator coils are positioned once in a sector with small oscillations of the mill sleeve and another time in a sector with strong oscillations of the mill sleeve.

9. The method of claim 4, comprising:
performing an additional measurement of differences between currents induced in stator coils in different sectors, and
based in the measured differences, determining information regarding a timing curve of movements in the mill sleeve.

10. A control system for operating a mill driven by a ring motor for receiving characteristic data, the mill comprises a rotating mill sleeve with rotor coils and a stator with stator coils, wherein oscillations of the mill sleeve are transmitted to stator coils and/or measurements coils positioned on the stator, the system comprising
a circuit for reading out an induction voltage from a stator coil of the mill, the circuit comprises at least one readout coil for inductive readout at a connecting line of the stator coil of the mill.

11. The system of claim 10, further comprising:
at least two readout coils configured for reading out at least one induction voltage on at least two stator coils by inductive coupling at a terminal line of the at least two stator coils,
wherein the at least two stator coils are connected in parallel and the at least two readout coils are connected antiparallel in a separate measurement circuit, and
wherein the difference between the induction voltages is measured in the separate measurement circuit.

12. The system of claim 10, further comprising:
at least one measurement unit for resistance measurements in a connecting line of a stator coil of the mill.

* * * * *